(12) United States Patent
Shaw et al.

(10) Patent No.: US 7,207,310 B2
(45) Date of Patent: Apr. 24, 2007

(54) NOISE ATTENUATION DEVICE FOR AN AIR INDUCTION SYSTEM

(75) Inventors: Christopher E. Shaw, Canton, MI (US); James B. Bielicki, Livonia, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 11/173,912

(22) Filed: Jul. 1, 2005

(65) Prior Publication Data

US 2007/0000467 A1    Jan. 4, 2007

(51) Int. Cl.
*F02B 77/04*    (2006.01)
*B65D 17/00*    (2006.01)

(52) U.S. Cl. .................. 123/198 E; 181/229

(58) Field of Classification Search ............ 123/198 E; 181/229
See application file for complete search history.

(56) References Cited

U.S. PATENT DOCUMENTS

| | | | |
|---|---|---|---|
| 1,953,543 A * | 4/1934 | Rensink | 181/229 |
| 2,043,988 A * | 6/1936 | Brown | 181/290 |
| 2,913,075 A * | 11/1959 | Zittle | 181/290 |
| 3,226,917 A | 1/1966 | Donovan et al. | |
| 3,355,863 A | 12/1967 | Pittsley | |
| 3,712,416 A | 1/1973 | Swanson et al. | |
| 3,835,956 A | 9/1974 | Kishira | |
| 3,966,014 A | 6/1976 | Gowing | |
| 4,050,913 A | 9/1977 | Roach | |
| 4,065,276 A | 12/1977 | Nakaya et al. | |
| 4,089,663 A | 5/1978 | Kulig et al. | |
| 4,093,039 A | 6/1978 | Moore et al. | |
| 4,326,865 A | 4/1982 | Siebels | |
| 4,360,075 A | 11/1982 | Blaser et al. | |
| 4,969,536 A | 11/1990 | Allen | |
| 5,014,816 A | 5/1991 | Dear et al. | |
| 5,417,727 A | 5/1995 | Bowen et al. | |
| 5,563,382 A | 10/1996 | Choyce | |
| 5,979,598 A | 11/1999 | Wolf et al. | |
| 6,205,968 B1 | 3/2001 | Spannbauer | |
| 6,688,425 B2 | 2/2004 | Cole et al. | |
| 6,736,238 B2 | 5/2004 | Kerr | |

FOREIGN PATENT DOCUMENTS

JP      60026157 A  *  2/1985

* cited by examiner

*Primary Examiner*—Noah P. Kamen
(74) *Attorney, Agent, or Firm*—Brinks Hofer Gilson & Lione

(57) ABSTRACT

An air induction system for a motor vehicle, having a pair of conduits fluidly connecting an engine to the ambient air and a housing located between the pair of conduits. The housing includes side walls and a top wall defining a chamber. A baffle plate for attenuating noise is positioned within the chamber adjacent to the top wall. Additionally, the baffle plate defines a plurality of openings extending therethrough.

9 Claims, 4 Drawing Sheets

NOISE ATTENUATION DEVICE FOR AN AIR INDUCTION SYSTEM

CROSS-REFERENCE TO RELATED APPLICATIONS

This application claims priority to U.S. Provisional Application Ser. No. 60/612,660, filed on Sep. 24, 2004.

BACKGROUND

1. Field of the Invention

The invention relates generally to an air induction system for a motor vehicle. More specifically, the invention relates to a noise attenuation device positioned within an air induction system.

2. Related Technology

As is known in the art, an air induction system supplies air to one or more combustion chambers in a vehicle engine. The variable-volume of each of the combustion chambers is controlled by an actuating piston within a combustion chamber cylinder. As the piston actuates in a downward direction (known as the downstroke) ambient air is drawn through the air induction system and into the combustion chamber for mixture with fuel vapor. The piston then actuates in an upward direction (known as the upstroke) and compresses the fuel-air mixture. Next, a spark plug ignites the compressed fuel-air mixture and causes the piston to move downwardly, thereby generating a work output for the motor vehicle.

Air induction systems typically include an air filter assembly to remove dirt and other particulates from the incoming air flow and to prevent such particulates from entering the combustion chamber. The air filter assembly typically includes a housing defining a chamber and an air filter located within the chamber. As the air flow is caused to flow through the air filter, particulates are trapped and removed from the airflow.

Air induction systems sometimes also include a turbocharger to provide a boost in the work output. More specifically, turbochargers are positioned in the air induction system, between the air filter assembly and the combustion chamber, to compress the ambient air. Due to its compressed state, the air is able to be mixed with an increased amount of fuel vapor, thereby increasing the maximum potential work output of the compression chamber. Typically, turbochargers include a rotating turbine that draws air towards the engine at an increased pressure.

The air stream entering the air induction system often causes the vehicle occupants to experience an increased noise, vibration, and harshness (NVH) level. More specifically, the actuating of cylinders causes pulses of air to be drawn into the air filter chamber, thereby increasing the NVH levels in the air induction system. Furthermore, vehicles that include turbochargers are especially susceptible to increased NVH levels due to the rotating compressor blades and the pressure pulsations they produce.

To reduce the NVH level within the vehicle, currently-known air induction systems therefore sometimes include a noise attenuation device. More specifically, these attenuation devices, known as sidebranch resonators, typically include a relatively large volume of stagnant air and a passageway having a relatively small area connecting the air intake conduit to the volume of stagnant air. For example, in one construction the passageway extends through the conduit housing in a direction transverse to the main airflow direction along the conduit. The volume of stagnant air is contained within a separate structure, such as a sleeve surrounding the conduit and cooperating with the conduit's outer surface to form a ring-shaped space, or a self-containing housing such as a sphere, of stagnant air that is connected to the passageway. During operation of the sidebranch resonators, air contained within the passageway resonates back and forth between the volume of stagnant air and the conduit, thereby attenuating noise within the conduit at a specific frequency.

This design however, requires additional components to define the volume of stagnant air, thereby requiring additional material costs and having a more bulky design. Therefore, the sidebranch resonators may not be able to be packaged in the underhood space and may be cost prohibitive.

In another currently-known design, a plurality of hollow fins are included in the conduit containing a volume of stagnant air and a number of "holes" that communicate with the conduit thereby reducing NVH levels in the same manner as the sidebranch resonator. However, similar to the sidebranch resonators, this design requires additional components and may be cost prohibitive to vehicle manufacturers. Furthermore, the fins may restrict airflow through the conduit.

It is therefore desirous to provide an air induction system with a noise attenuation device that substantially reduces the NVH levels experienced by the vehicle occupants, a simple construction and a generally compact design.

SUMMARY

In overcoming the limitations and drawbacks of the prior art, the present invention provides an air induction system including a pair of conduits fluidly connecting an engine to the ambient air and a housing located between the pair of conduits. The housing defines a chamber in which is positioned a baffle plate for attenuating noise is positioned within the housing adjacent to the top wall. The baffle plate is located adjacent to a top wall of the housing and includes a plurality of openings extending therethrough.

In another embodiment, the baffle plate has a generally corrugated shape to attenuate noise over a range of frequencies. More specifically, the baffle plate includes: a plurality of peaks located a first distance from the top wall to attenuate noise having a lower bound frequency, a plurality of troughs located a second distance from the top wall to attenuate noise having an upper bound frequency, and portions of the baffle plate located between the peaks and troughs respectively to attenuate noise having frequencies between the upper and lower bounds.

Preferably, attenuation by the system is for the range of frequencies is between 2,000 and 18,000 Hertz. In an even more preferred design, the range of attenuated frequencies is between 6,000 Hertz and 20,000 Hertz.

In yet another embodiment, the openings defined in the baffle plate extend in a direction that is generally normal to the top wall, thereby causing sound waves traveling through the openings to reflect off of the housing wall with a minimal angle of incidence.

Additionally a sound absorbing material may be positioned between the baffle plate and the top wall to further absorb noise within the chamber. The sound absorbing material is preferably a foam material or any other suitable sound absorbing material.

Further objects, features and advantages of this invention will become readily apparent to persons skilled in the art

DETAILED DESCRIPTION

Figure 1:
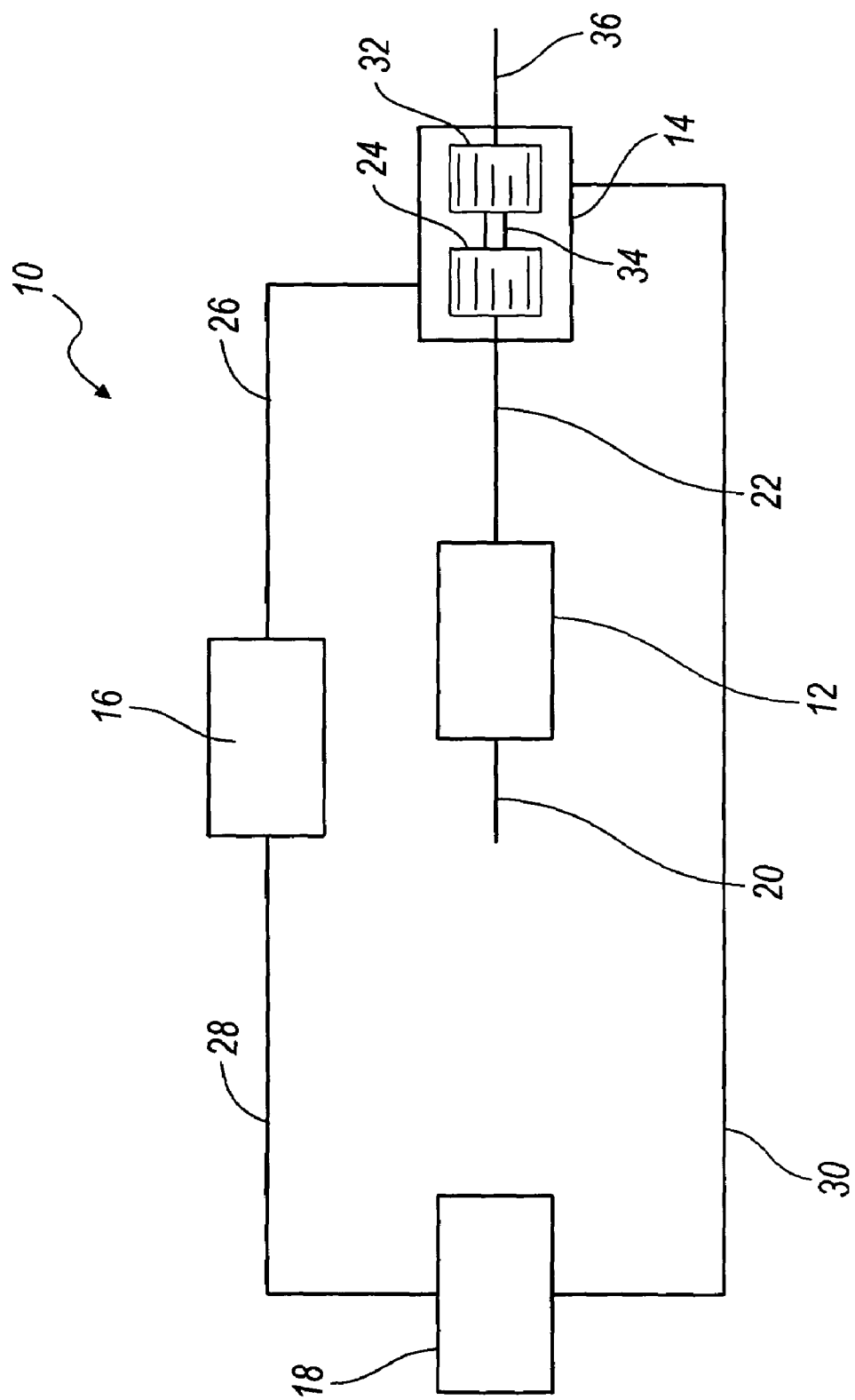
FIG. 1 is a circuit diagram representing an air induction system embodying the principles of the present invention, where the induction system includes an air filter assembly, a turbocharger, an air cooler, and an engine.

Referring now to the drawings, FIG. 1 illustrates a circuit diagram representing an air induction system 10 having an air filter assembly 12, a turbocharger 14, an air cooler 16, and an engine 18 that are fluidly connected with each other. The air filter assembly 12 receives ambient air through an inlet conduit 20 and provides filtered air to the turbocharger 14 via a second conduit 22. The air is then compressed in the turbocharger 14 by a driven turbine 24, as is discussed in further detail below.

Next, the compressed air flows along a third conduit 26 into the air cooler 16, which lowers the temperature and increases the density of the air. The cooled, compressed air then flows along a fourth conduit 28 to a combustion chamber of the engine 18, where it becomes mixed with fuel vapor and undergoes combustion. Due to the increased pressure of the air (from the turbocharger 14) and the increased density of the air (from the air cooler 16), an increased amount of fuel vapor can be injected into the combustion chamber while maintaining a desired air-fuel ratio. As a result of the increased fuel combustion, the engine 18 work output is increased.

From the engine 18, hot exhaust gases from the combustion chamber flow along a fifth conduit 30 to a chamber of the turbocharger 14 that houses a driving turbine 32, which is rotatably connected to the driven turbine via a shaft 34. The exhaust gases flowing through the fifth conduit 30 drive the driving turbine 32, which in turn drives the driven turbine 24 and compresses the filtered air. The exhaust gases then flow out of the turbocharger 14 and into the atmosphere via an outlet conduit 36.

Figure 2:
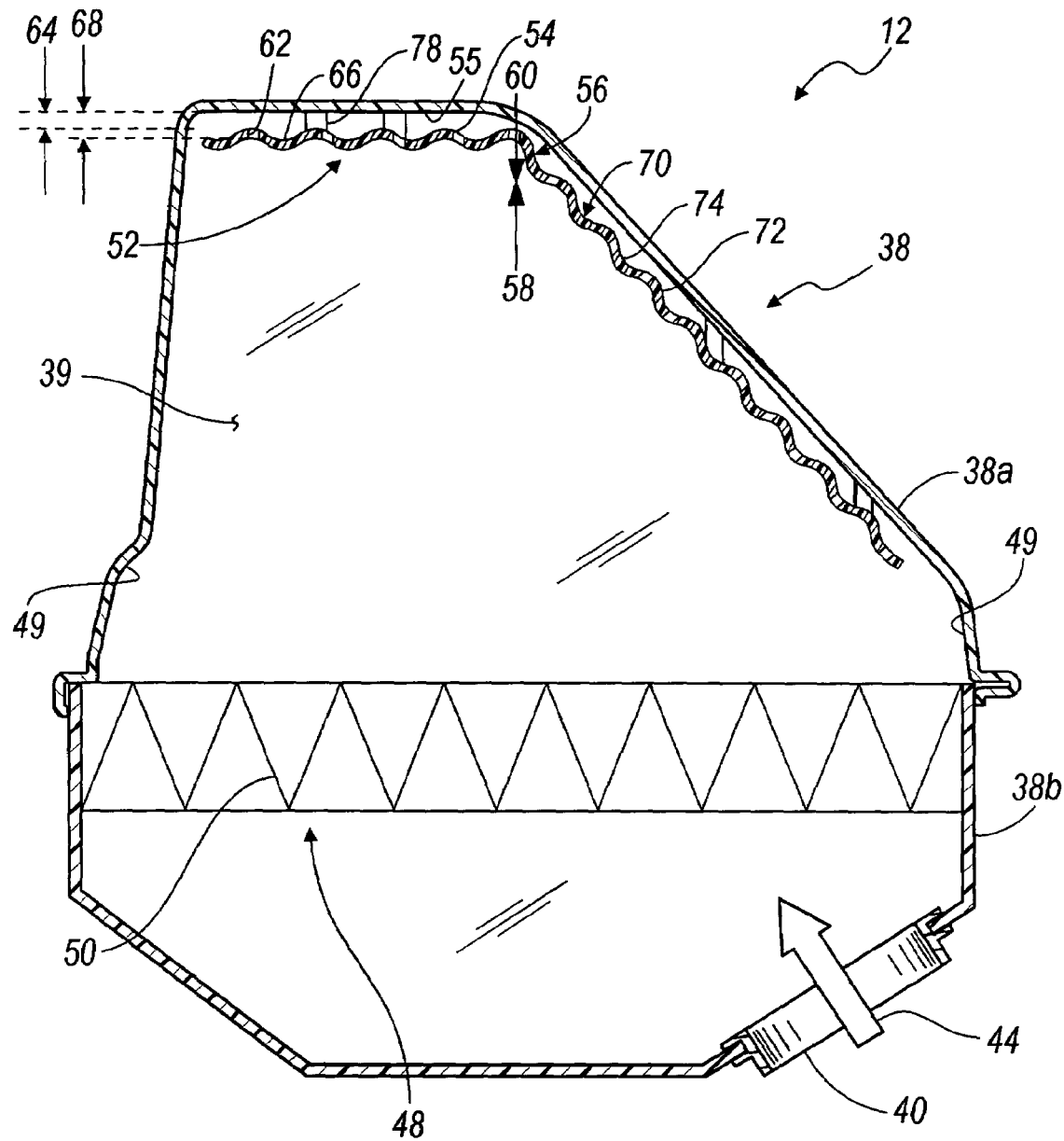
FIG. 2 is a cross-sectional view of the air filter assembly represented in FIG. 1, including a housing and a baffle plate located therewithin.
Figure 3:
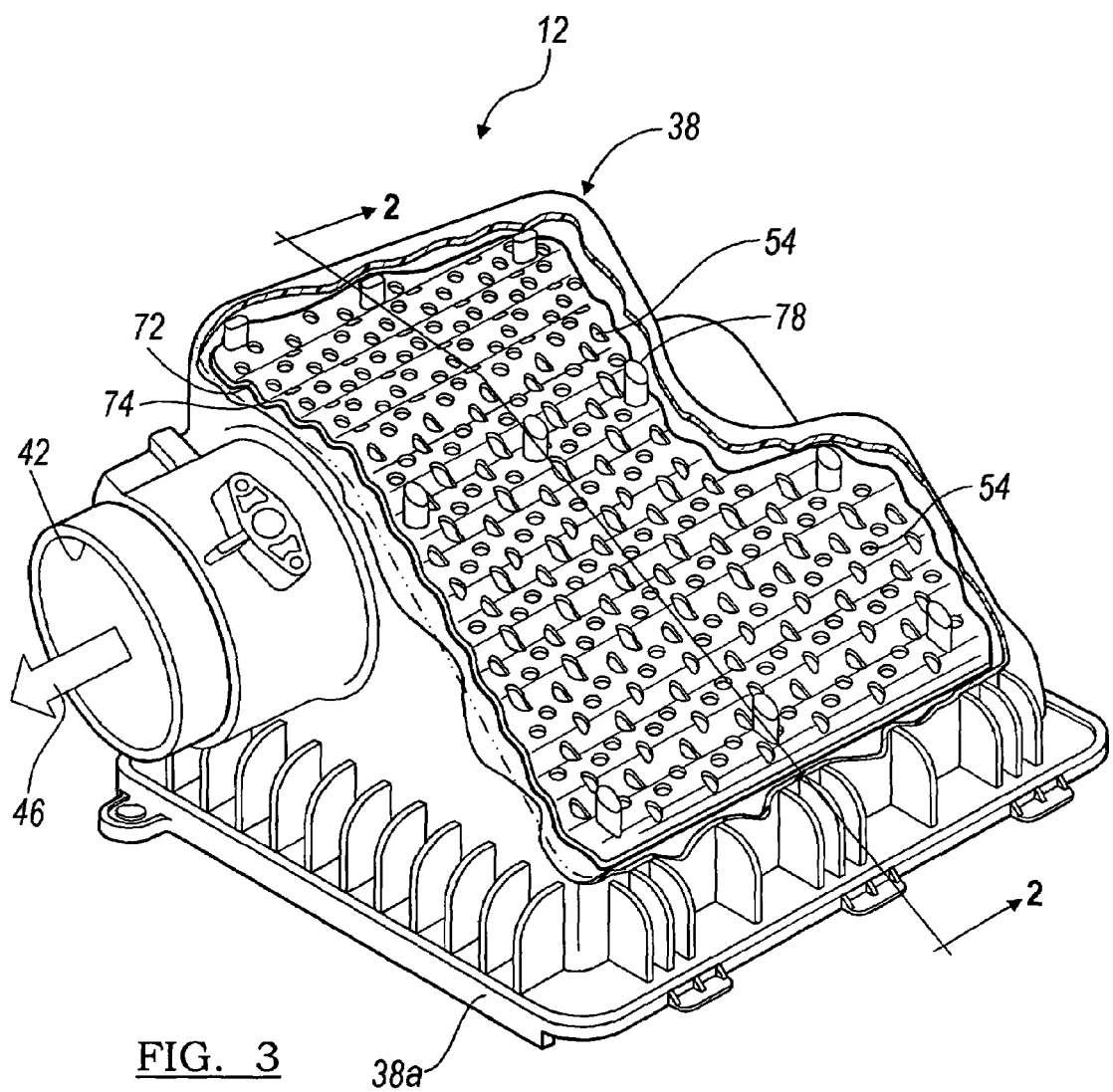
FIG. 3 is an isometric view of an upper section of the housing shown in FIG. 2, with a portion of the housing cut-away for illustrative purposes.

Referring to FIGS. 2 and 3, the air filter assembly 12 includes a housing 38 having upper 38a and lower 38b sections that define a chamber 39. An inlet 40 and an outlet 42 are also fluidly connected to the chamber 39. The inlet 40 is connected to the inlet conduit 20, as mentioned above, and the outlet 42 is connected to the second conduit 22, also mentioned above, such that ambient air flows into the chamber 39 in a direction indicated by arrow 44 and out of the chamber 39 in a direction generally indicated by arrow 46. The inlet 40 and the outlet 42 are each formed of a material that is conducive to forming a fluid-tight seal with the respective conduits 20, 22, such as rubber or plastic, but any appropriate material may be used. Alternatively, the inlet 40, and the outlet 42 may each formed as a single, unitary part with respective upper and lower sections 38a 38b of the housing 38.

The upper section 38a and the lower section 38b are coupled with each other by an easily-releasable connection, such as a snap-fit connection or with a set of fastening elements (not shown). The easily-releasable connection permits convenient and repeatable access to the chamber 39 during assembly and maintenance of the air filter assembly 12. Alternatively, the housing 38 is a single, unitary component.

An air filter 48 is located within the housing 38 between the inlet 40 and outlet 42. More specifically, the air filter 48 forms a generally fluid-tight seal with side walls 49 of the housing 38 such that the air flowing through the housing 38 passes through the air filter 48, thereby preventing dust and other particulates from flowing into the turbocharger 14. The air filter 48 includes a filter element 50 formed of one or more relatively thin materials, such as paper, cloth, foam, and wire mesh. To maximize the surface area and the effective life of the air filter 48, the filter element 50 preferably has a series of generally linear folded sections or corrugations defining a serpentine pattern across the width of the housing 38. Alternatively, the filter element 50 is made of any suitable material, such as an absorbent sponge-like material.

A baffle plate 52 is positioned within the chamber 39 to attenuate the noise within the air filter assembly 12 and within the air induction system 10 in general. As discussed above, the actuating cylinders of the engine 18, as well as the blades contained within the turbocharger 14, cause pulses of air to be drawn into and through the air filter chamber, thereby causing the NVH levels in the air induction system. Therefore, the baffle plate 52 reduces these NVH levels caused by the relatively high frequency pulses present in the air induction system 10. The baffle plate 52 is especially desirable in an air induction system 10 having the turbocharger 14, which causes higher frequencies which must be attenuated.

The baffle plate 52 is a relatively thin sheet of a generally rigid material, such as plastic or metal, that includes a plurality of openings 54 extending therethrough. The openings 54 permit sound waves to flow through the baffle plate 52. To more effectively attenuate the noise within the chamber 39 and the system 10, the baffle plate 52 is preferably positioned adjacent to and generally parallel with a wall, such as a top wall 55 or one of the side walls 49, of the housing 38 to cooperate and cancel high frequency sound waves.

More specifically, the openings 54 allow the high frequency sound waves contained in the chamber 39 to enter the space between the baffle plate top surface 56 and top wall 55. The sound waves enter along a first direction 58 defined by the centerline of the baffle openings 54 and are then reflected off of the wall adjacent to the baffle plate 52, such as the top wall 55 of the housing, in a second or opposite direction 60 to cancel the sound waves traveling in the first direction 58. More specifically, the baffle plate 52 is positioned a distance away from the top wall 55 such that the sound waves traveling in the second direction 60 are off-set or out of phase with the sound waves traveling in the first direction 58, thereby at least partially canceling the sounds waves traveling in the first direction 58.

Noise occurs within the chamber 39 at various frequencies based on the geometries of the various components of the air induction system 10 as well as the operating speed of both the engine 18 and turbocharger 14. The extent to which the frequencies are attenuated depends on the parameters of the baffle plate 52. For example, parameters include (but are not limited to): the thickness of the baffle plate 52, the size of the openings 54, the number of openings 54, the distance between the baffle plate 52 and the adjacent wall of the housing 38, and the orientation of the baffle plate 52 with respect to the wall.

The distance between the baffle plate 52 and the wall affects the phase-shift of the reflected sound waves, thereby affecting the amount that the sound waves moving in the first direction 58 are cancelled by the sound waves moving in the second direction 60. The turbocharger 14 causes the noises within the air induction system 10 to have relatively high system frequencies, typically ranging from 2,000 Hertz to 18,000 Hertz. Therefore, in the design shown in the figures, the baffle plate 52 is preferably positioned a distance between 0.5 and 30 millimeters from the wall to substantially attenuate noises having these frequencies.

Also, the thickness of the baffle plate 52, the size of the openings 54, and the number of openings 54 can influence the noise attenuation. The thickness of the baffle plate 52, preferably between 1.5 and 21 millimeters thick, can add secondary tuning points for the device in the range of 6000 Hertz to 18000 Hertz. The diameter of the baffle plate openings 54, which is preferably between 4 and 30 millimeters, can affect the amount of attenuation.

Therefore, by modification of the above described baffle plate parameters for a given system 10 and housing 38, the baffle plate 52 may be designed to effectively attenuate noises having a specific frequency that is typical in a particular vehicle air induction system.

Additionally, the baffle plate 52 may be configured to attenuate noises over a range of system frequencies that may occur in a particular vehicle air induction system. More specifically, by designing the baffle plate 52 such that one or more of the parameters varies along different portions of the baffle plate 52, the different portions will attenuate different system frequencies. For example, if the distance between the baffle plate 52 and the top wall 55 varies such that a first portion 62 of the baffle plate 52 is a first distance 64 from the top wall 55 of the housing and a second portion 66 is a second distance 68 from the top wall 55, the sound waves flowing through the openings 54 at the first portion 62 have a first phase-shift and sound waves traveling through the openings 54 at the second portion 64 have a second phase-shift to respectively attenuate incoming sound waves at first and second frequencies. Illustratively, when the first frequency is between 6,000 and 10,000 Hertz and the second frequency is between 10,000 and 14,000 Hertz, the first distance is between 8 and 14 millimeters and the second distance is between 6 and 8 millimeters.

In the design shown of the figures, the first and second distances 64, 68 are achieved by providing a non-linear baffle plate 52. In an alternative design, the baffle plate 52 may be substantially planar and one of the other parameters is varied along the baffle plate 52 to achieve the varied distances.

The non-planar baffle plate 52 shown in the figures has a generally corrugated surface 70 having peaks 72 located the first distance 64 from the top wall 55 and troughs 74 located the second distance 68 from the top wall 55. The openings 54 are located at various points along the corrugated surface 70 to substantially attenuate noises of all frequencies along the range of system frequencies described above. The corrugated surface 70 in the figures has a generally smooth series of peaks 72 and troughs 74 defining a generally sinusoidal function. This smooth shape causes generally equal noise attenuation along the range of system frequencies. Alternatively, the non-planar baffle plate 52 may have a series of folded planar sections which have the ability to attenuate specific system frequencies.

Figure 4:
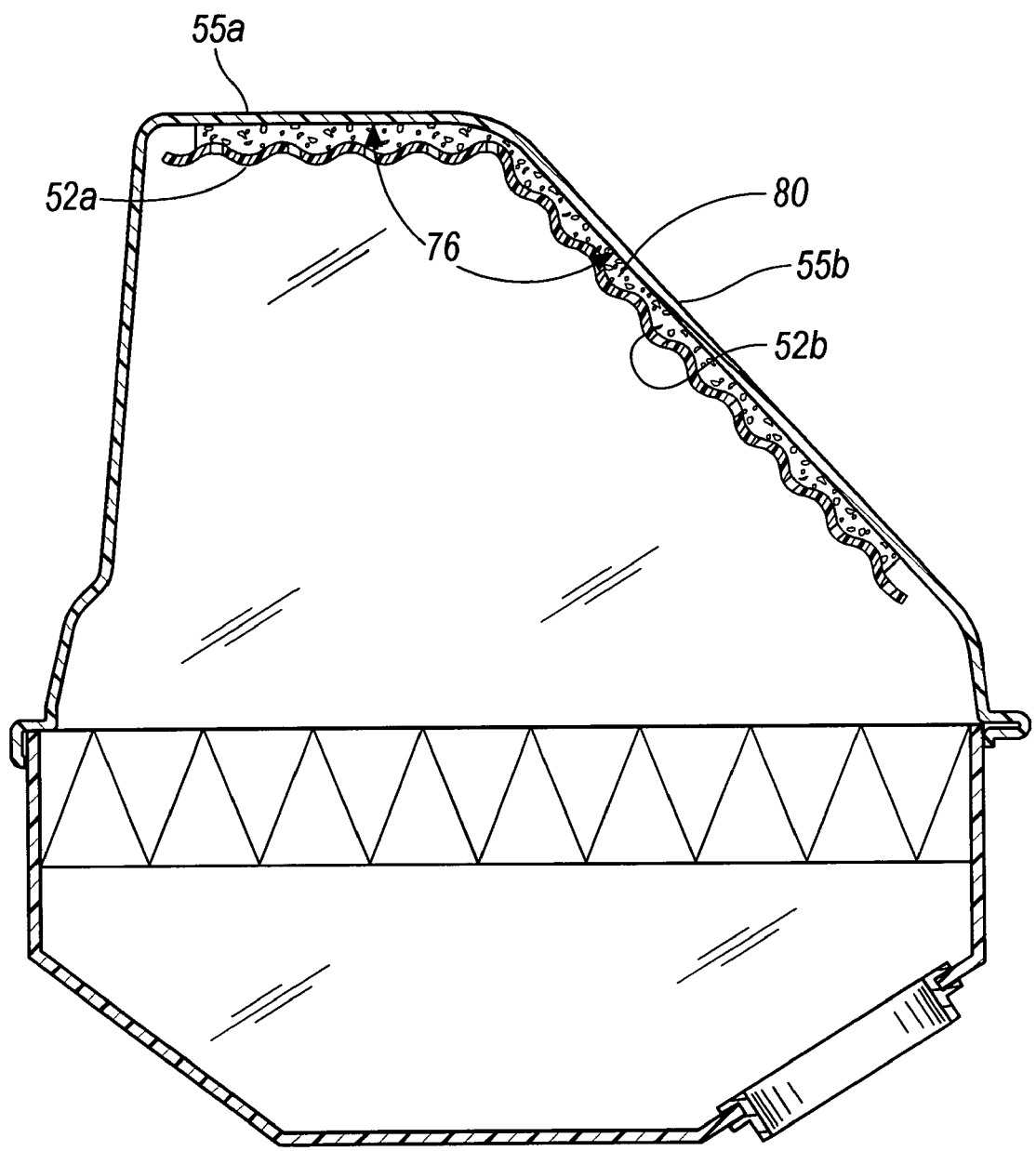
FIG. 4 is a cross-sectional view similar to FIG. 2 of an alternative design of an induction system embodying the principles of the present invention.

The baffle plate 52 shown in the figures is preferably manufactured by first forming the corrugated surface 70 by any appropriate method, such as molding. Next, the baffle plate 52 is shaped to correspond to the top wall 55 of the housing 38. For example, as shown in FIG. 4, the top wall 55 in the figures has a first, generally planar portion 55a and a second, generally planar portion 55b extending away from the first portion 55a at an angle 76. Similarly, the baffle plate 52 in the figures has a first portion 52a and a second portion 52b extending away from each other at the angle 76. This configuration causes the baffle plate 52 to be generally parallel with or correspondingly contoured with the top wall 55, as described above.

Referring back to FIGS. 2 and 3, the baffle plate 52 is secured to the housing 38 by a plurality of attachment stakes 78 extending between the baffle plate 52 and the top wall 55. The attachment stakes 78 each have a generally equal height such as to position the baffle plate 52 equidistantly from with the top wall 55. However, the heights of the attachment stakes 78 may vary slightly depending on their position with respect to the peaks 74 and troughs 74 of the baffle plate 52.

The attachment stakes 78 are preferably made of a material that is easily bonded to the respective components 52, 55 by an appropriate method, such as heat staking, welding or adhesive bonding. For example, the attachment stakes are preferably formed of a plastic material that can be melted to form permanent bonds with the respective components 52, 55. As a further alternative, the attachment stakes 78 may be unitary portions of the baffle plate 52 that are secured to the top wall 55. In yet another alternative design, any suitable connection between the respective components 52, 55 may be used.

As shown in FIG. 4, a sound absorbing material 80 is provided between the baffle plate 52 and the top wall 55. The sound absorbing material 80 further attenuates noise within the air filter assembly 12 by absorbing sound waves. In a preferred design, the sound absorbing material 80 is made of foam, but any suitable material having the desired attenuating characteristics may be used. Furthermore, the sound absorbing material 80 may be used to secure the baffle plate 52 to the top wall 55, thereby functionally replacing the attachment stakes 78.

It is therefore intended that the foregoing detailed description be regarded as illustrative rather than limiting, and that it be understood that it is the following claims, including all equivalents, that are intended to define the spirit and scope of this invention.

What is claimed is:

1. An air induction system for a motor vehicle comprising:
   a first conduit fluidly connected to ambient air;
   a second conduit fluidly connected to an engine;
   a housing defining a chamber having an inlet and an outlet and being located between and connected to the first and second conduits;
   a baffle plate positioned within the housing to attenuate noise within the chamber, portions of the baffle plate defining a plurality of openings extending therethrough, and the baffle plate having a generally corrugated shape whereby a range of frequencies of the noise is attenuated; and
   a sound absorbing material located between the baffle plate and the housing and mounting the baffle plate to the housing.

2. The air induction system of claim 1, wherein the range of frequencies is between 2,000 and 18,000 Hertz.

3. The air induction system of claim 2, wherein the range of frequencies is between 6,000 Hertz and 14,000 Hertz.

4. The air induction system of claim 1, wherein the baffle plate has a plurality of peaks located a first distance from a housing wall and a plurality of troughs located a second distance from the housing wall, wherein the first distance is between 4 and 8 millimeters and the second distance is between 8 and 12 millimeters.

5. The air induction system of claim 1, further comprising a plurality of support members connecting the baffle plate to the housing.

6. The air induction system of claim 1, further comprising a turbocharger positioned between the housing and the engine.

7. An air induction system for a motor vehicle comprising:
a first conduit fluidly connected to ambient air;
a second conduit fluidly connected to an engine;
a housing having side walls and a top wall defining a chamber, the housing located between and fluidly connected to the first and second conduits;
a baffle plate defining a plurality of openings extending therethrough, wherein the openings extend in a direction that is generally normal to the top wall of the housing to attenuate noise within the chamber and wherein the baffle plate is non-planar to attenuate a range of frequencies of the noise within the chamber.

8. The air induction system of claim 7, further comprising a sound absorbing material located between the baffle plate and the housing.

9. The air induction system of claim 8, wherein the sound absorbing material mounts the baffle plate to the housing.

* * * * *